(12) United States Patent
Sano

(10) Patent No.: US 9,715,461 B2
(45) Date of Patent: Jul. 25, 2017

(54) CACHE MEMORY CONTROL CIRCUIT AND PROCESSOR

(71) Applicant: KABUSHIKI KAISHA TOSHIBA, Minato-ku, Tokyo (JP)

(72) Inventor: Toru Sano, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 298 days.

(21) Appl. No.: 14/477,547

(22) Filed: Sep. 4, 2014

(65) Prior Publication Data

US 2015/0248354 A1 Sep. 3, 2015

Related U.S. Application Data

(60) Provisional application No. 61/947,132, filed on Mar. 3, 2014.

(51) Int. Cl.
| | | |
|---|---|---|
| G06F 12/06 | (2006.01) | |
| G06F 12/122 | (2016.01) | |
| G06F 12/0871 | (2016.01) | |
| G06F 12/0864 | (2016.01) | |
| G06F 12/123 | (2016.01) | |

(52) U.S. Cl.
CPC ........ *G06F 12/122* (2013.01); *G06F 12/0864* (2013.01); *G06F 12/0871* (2013.01); *G06F 12/123* (2013.01); *G06F 2212/604* (2013.01); *G06F 2212/69* (2013.01)

(58) Field of Classification Search
USPC ........................................................ 711/135
See application file for complete search history.

(56) References Cited

U.S. PATENT DOCUMENTS

| | | |
|---|---|---|
| 6,023,747 A | 2/2000 | Dodson |
| 6,049,849 A | 4/2000 | Arililli et al. |
| 6,647,463 B2 | 11/2003 | Yamashiroya |
| | (Continued) | |

FOREIGN PATENT DOCUMENTS

| | | |
|---|---|---|
| JP | 11-184752 | 7/1999 |
| JP | 2001-051899 | 2/2001 |

OTHER PUBLICATIONS

Michael D. Powell et al, "Reducing Set-Associative Cache Energy via Way-Prediction and Selective Direct-Mapping", Proceedings of the 34th International Symposium on Microarchitecture (MICRO), 2001.*

*Primary Examiner* — Pierre-Michel Bataille
(74) *Attorney, Agent, or Firm* — Knobbe, Martens, Olson & Bear, LLP

(57) ABSTRACT

According to an embodiment, a cache memory control circuit includes: a hit determination section; a refill processing section; a search section configured to determine a refill candidate way by searching for the way candidate for a refill process from a plurality of ways based on an LRU algorithm when the hit determination section detects a cache miss; a binary tree information section configured to store binary tree information for the LRU algorithm; a conflict detection section; and a control section. The control section updates the binary tree information in the binary tree information section by using way information of the way where the refill process is being executed when the conflict detection section determines that the way where the refill process is being executed and the refill candidate way match each other.

17 Claims, 5 Drawing Sheets

(56) References Cited

U.S. PATENT DOCUMENTS

| | | | |
|---|---|---|---|
| 6,983,346 B2* | 1/2006 | Zhang | G06F 12/0802 |
| | | | 711/138 |
| 7,512,739 B2 | 3/2009 | Sawdey et al. | |
| 7,996,632 B1* | 8/2011 | Grohoski | G06F 9/30032 |
| | | | 710/37 |
| 8,452,944 B2* | 5/2013 | Ito | G06F 7/02 |
| | | | 711/154 |
| 9,235,522 B2* | 1/2016 | Ito | G06F 12/0862 |
| 2004/0024967 A1* | 2/2004 | Zhang | G06F 12/0802 |
| | | | 711/118 |
| 2005/0223165 A1* | 10/2005 | Schmidt | G06F 12/0866 |
| | | | 711/113 |
| 2007/0156964 A1* | 7/2007 | Sistla | G06F 12/121 |
| | | | 711/133 |
| 2008/0301372 A1 | 12/2008 | Kojima et al. | |
| 2009/0172285 A1* | 7/2009 | Smith | G06F 12/123 |
| | | | 711/125 |
| 2012/0198174 A1* | 8/2012 | Nellans | G06F 12/0804 |
| | | | 711/133 |
| 2012/0246410 A1* | 9/2012 | Xu | G06F 12/126 |
| | | | 711/128 |
| 2015/0186292 A1* | 7/2015 | Sundaram | G06F 12/1045 |
| | | | 711/207 |

\* cited by examiner

CACHE MEMORY CONTROL CIRCUIT AND PROCESSOR

FIELD

Embodiments described herein relate generally to a cache memory control circuit and a processor.

BACKGROUND

Conventionally, cache memories have been widely used in processors so as to access to fast data from main memories. A cache memory is provided between a central processing unit (hereinafter referred to as CPU) and a main memory. Note that multiple levels of caches, such as so-called L2 and L3 caches, are provided as the cache memory in some cases.

Some cache memories, such as a set associative cache memory, have a plurality of ways for one line so as to improve a cache hit rate.

When an access request to the main memory is issued from the CPU, the cache memory searches whether data relating to the access request exists in the cache memory. When the data exists in the cache memory, the cache memory returns the data to the CPU. When the data does not exist in the cache memory, the cache memory reads out the data relating to the access request from the main memory, or a cache or a memory of a next level such as an L2 cache. The cache memory is refilled by replacing data in the cache memory in predetermined units (e.g., in line units).

In the refill, replacement control is performed so as to determine data in which line of which way is to be evicted and replaced with the data from the main memory. In the replacement control, a line that has not been used for a longest period of time (that is, a line of a way that was accessed earliest) is refilled by using an LRU (least recently used) algorithm in some cases.

Examples of the cache memory include a so-called non-blocking cache memory configured to receive a next access request even during a refill. In the non-blocking cache memory, when the next access request results in a cache miss to require a new refill during the refill, the replacement control needs to be performed such that a way for a line whose data is to be replaced with the new refill, and a way for a line being refilled for replacing data do not match each other. This is to prevent the refilled line from being overwritten with another line data.

To this end, a technique for shifting one of the lines from the other line by the number of block transfer requests such that the lines do not match each other has been also proposed.

However, when the method of simply shifting the line by a predetermined number is employed, a line contrary to a policy of the LRU algorithm is selected as a line where data replacement is performed. As a result, a latency or a cache hit rate of the cache memory may be deteriorated.

DETAILED DESCRIPTION

A cache memory control circuit of an embodiment controls a cache memory having a plurality of ways and storing cache data. The cache memory control circuit includes: a cache miss detection section configured to detect a cache miss for an access request; a refill processing section configured to refill the cache memory by replacing the cache data; a search section configured to determine a refill candidate way by searching for the refill candidate way from the plurality of ways based on a predetermined algorithm when the cache miss is detected; an information storage section configured to store predetermined information for the predetermined algorithm; a match determination section configured to determine whether or not a way being refilled for a first cache miss and the refill candidate way for a second cache miss detected after the first cache miss match each other; and a control section configured to update the predetermined information by using information of the way being refilled when the way being refilled and the refill candidate way are determined to match each other.

First Embodiment

Figure 1:
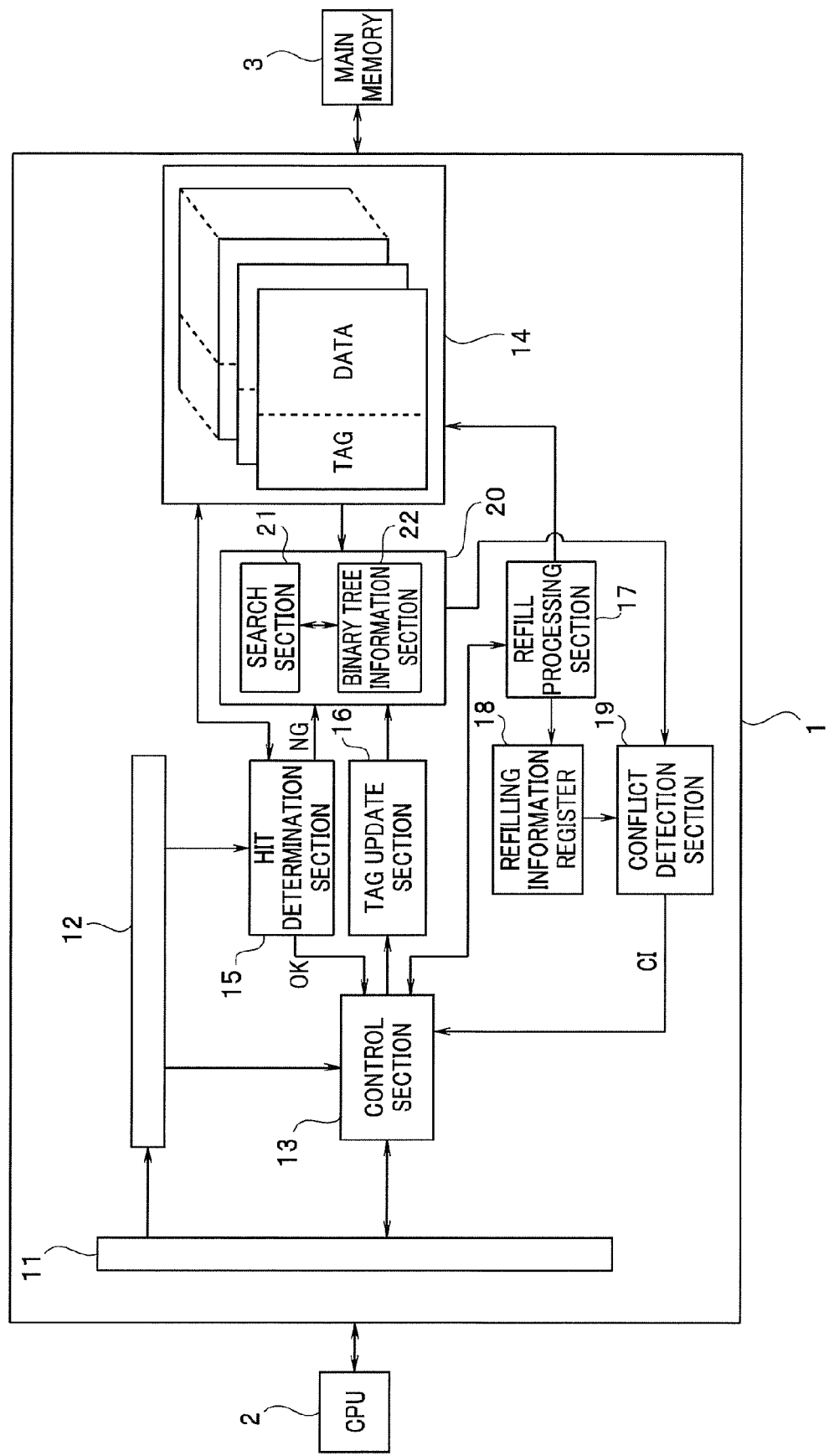
FIG. 1 is a block diagram illustrating a configuration of a cache memory of a first embodiment.

FIG. 1 is a block diagram of a cache memory of the present embodiment.

A cache memory 1 of the present embodiment is a set associative cache memory. The cache memory 1 is arranged between a CPU 2 and a main memory (or an L2 cache) 3. The cache memory 1, the CPU 2, and the main memory 3 constitute a processor.

The cache memory 1 includes an input/output interface 11, an address register 12, a control section 13, a storage section 14, a hit determination section 15, a tag update section 16, a refill processing section 17, a refilling information register 18, a conflict detection section 19, and a replacement control section 20. The replacement control section 20 includes a search section 21 and a binary tree information section 22. The cache memory 1 is a non-blocking cache configured to receive a next access request even during a refill.

A data access request (hereinafter referred to as access request) to the main memory 3 is input to the input/output interface 11 from the CPU 2, and data relating to the access request is output from the input/output interface 11 to the CPU 2. When the access request is input, the input/output interface 11 outputs the access request to the control section 13.

When the access request is input to the input/output interface 11, an address relating to the access request is stored in the address register 12.

When receiving the access request, the control section 13 controls various circuits in the cache memory 1 to acquire the data relating to the access request, and outputs the data to the CPU 2 via the input/output interface 11.

The storage section 14 is a small-capacity memory configured to store data, and is an SRAM having a plurality of ways. The storage section 14 includes a tag memory section and a data memory section. The data is stored in the storage section 14 in predetermined line units. In the refill, data replacement is performed in line units. Therefore, the cache memory 1 has a plurality of ways, and is refilled by replacing the cache data in predetermined units (here, in line units).

The hit determination section 15 determines whether or not the data relating to the access request exists in the storage section 14 by comparing tag data of the address relating to the access request and tag data in the storage section 14. That is, the hit determination section 15 is a hit determination section configured to determine whether or not a cache hit occurs, in other words, a cache miss detection section configured to detect a cache miss for an access request. A determination result of the hit determination section 15 is supplied to the control section 13 and the replacement control section 20.

The tag update section 16 updates status information of respective nodes of the binary tree information section 22.

The refill processing section 17 refills a way determined by the replacement control section 20 by replacing line data when a cache miss occurs. The refill processing section 17 outputs status information indicating whether or not the refill is being performed to the control section 13 as well as refilling the way by replacing the line data. The refill processing section 17 outputs way information and line information being refilled to the refilling information register 18.

The refilling information register 18 is a storage section configured to store the way information and the line information being refilled.

The conflict detection section 19 detects whether or not the refill is performed on a same way. Since the cache memory 1 is a non-blocking cache, the cache memory 1 may receive a next access request during the refill. When a same line of a same way is to be refilled for the access request received during the refill, a conflict occurs.

More specifically, the conflict detection section 19 outputs conflict information CI indicating that a way conflict occurs to the control section 13, when the way information and the line information stored in the refilling information register 18, and way information and line information of a refill candidate way match each other.

The search section 21 determines a way candidate for a line to be refilled when a cache miss occurs. The search section 21 is a circuit configured to perform replacement control using an LRU algorithm. Here, replacement control using a pseudo LRU algorithm having a tree structure for searching for a way based on binary tree information of the binary tree information section 22 is performed.

That is, when the hit determination section 15 detects a cache miss, the search section 21 determines a way candidate (a refill candidate way) to be refilled by searching for the way candidate out of the plurality of ways based on the predetermined algorithm. The replacement control section 20 outputs the way information and the line information of the refill candidate to the conflict detection section 19.

The binary tree information section 22 stores predetermined information for the pseudo LRU algorithm.

As described above, the address register 12, the control section 13, the hit determination section 15, the tag update section 16, the refill processing section 17, the refilling information register 18, the conflict detection section 19, and the replacement control section 20 constitute a cache memory control circuit configured to control the storage section 14 serving as a cache memory.

The binary tree information used for the LRU algorithm is described hereinafter.

Figure 2:
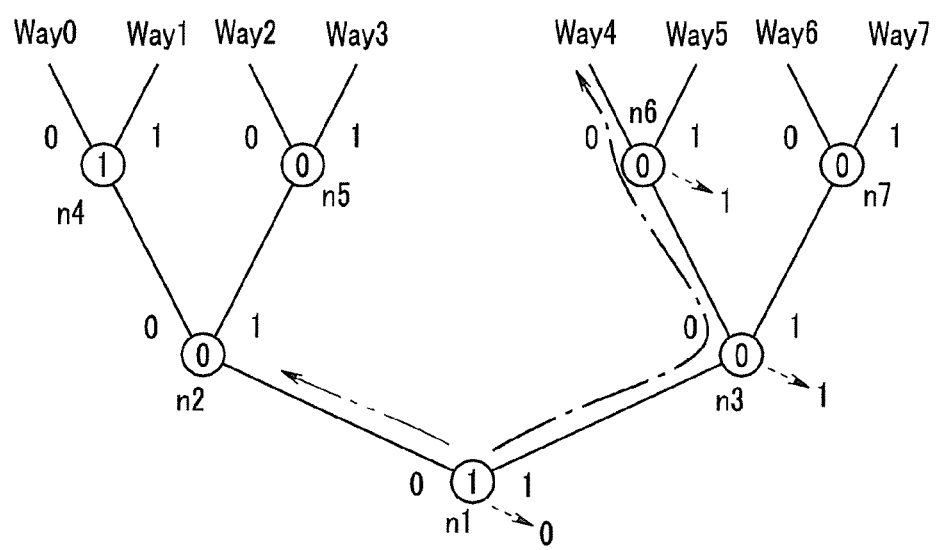
FIG. 2 is a view for explaining binary tree information in a case of 8 ways according to the first embodiment.

FIG. 2 is a view for explaining binary tree information in a case of 8 ways. The binary tree information shown in FIG. 2 is stored in the binary tree information section 22 in a predetermined data format. The binary tree information is defined by a plurality of nodes n and a connection relationship among the nodes.

The binary tree information further includes status information of the respective nodes. Each of the nodes has status information of 0 or 1, and includes two children corresponding to 0 and 1. A way is selected by selecting a child node (n2 or n3) indicated in status information of a node n1 that is a route of the binary tree information, selecting a child (n4, n5, n6, or n7) indicated in status information of the selected child node (n2 or n3), and also selecting a way indicated by a child indicated in status information of the selected child node.

The search section 21 traces the nodes sequentially from the node n1 based on the status information, and thereby searches for an LRU way, that is, a way considered to be least recently used and oldest.

In FIG. 2, since the status of the node n1 is 1, the node n3 is selected. Since the status of the node n3 is 0, the node n6 is selected. Since the status of the node n6 is 0, Way 4 is selected.

When a cache hit occurs, and when a cache miss occurs and a refill is performed, the tag update section 16 changes the status information of the respective nodes up to the hit way or the refilled way.

In the case of FIG. 2, when a line of the Way 4 is refilled, the tag update section 16 changes the status information of the nodes n6, n3, and n1 indicating the Way 4 to values opposite to current values. As indicated by dotted arrows, the node n6 is changed to 1, the node n3 is changed to 1, and the node n1 is changed to 0. As a result, when the replacement control is executed next time, a node search is executed in a direction indicated by an alternate long and two short dashes line. Thus, the Way 4 is not determined as a way that is least recently used.

Since the LRU algorithm using the binary tree is well known, description on a detailed process of the search section 21 for the replacement control is omitted.

(Operation)

Figure 3:
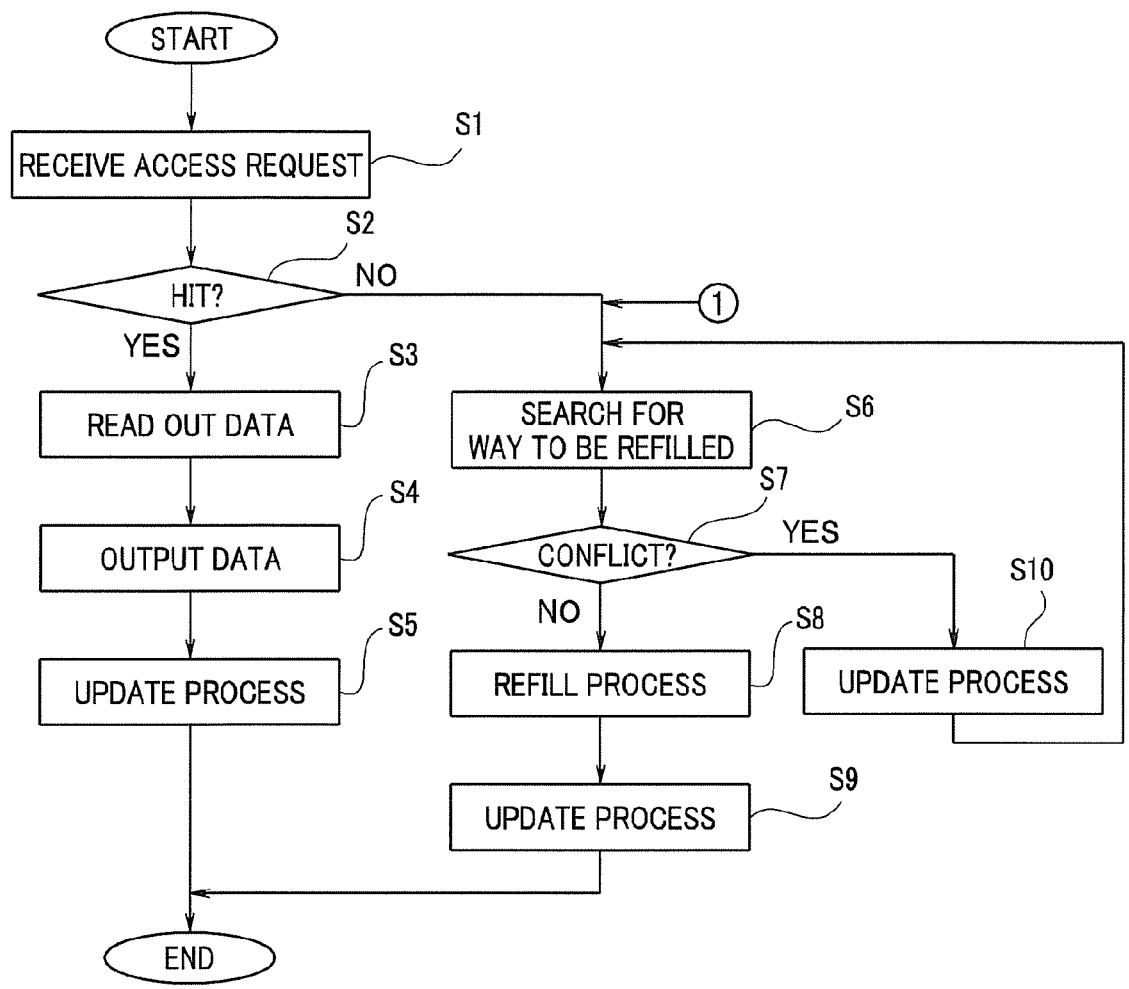
FIG. 3 is a flowchart for explaining an operation of a cache memory 1 according to the first embodiment.

Next, an operation of the cache memory 1 is described. FIG. 3 is a flowchart for explaining the operation of the cache memory 1. FIG. 3 shows the operation of the cache memory 1 when an access request is issued from the CPU 2.

The input/output interface 11 receives the access request from the CPU 2, that is, a data access request to the main memory 3 (S1). The access request is input to the control section 13 and the hit determination section 15.

The hit determination section 15 determines whether or not data relating to the access request exists in the storage section 14, that is, whether or not a cache hit occurs (S2).

When the hit determination section 15 determines that the cache hit occurs (S2: YES), that is, that the data relating to the access request exists in the storage section 14, the control section 13 reads out the data relating to the access request from the storage section 14 through an unillustrated signal line (S3).

The control section 13 outputs the read-out data to the CPU 2 via the input/output interface 11 (S4).

Moreover, the control section 13 operates the tag update section 16 to update the status information in the binary tree information section based on information of a way and a line where the read-out data exists (S5). That is, when the cache hit is detected for the access request, the control section 13 updates the predetermined information (here, the status information of the binary tree information) in the binary tree information section 22 serving as an information storage section by using the information of the way where the cache hit occurs.

When the hit determination section 15 determines that the cache hit does not occur (S2: NO), that is, that the data relating to the access request does not exist in the storage section 14, the cache memory 1 reads out data from the main memory 3. The control section 13 operates the search section 21 to execute a search process of a way to be refilled (S6). The search section 21 searches for a way that is least recently used. A candidate way for a line to be refilled is determined by the search process in S6. The replacement control section 20 supplies way information of the determined candidate way together with line information to the conflict detection section 19.

The conflict detection section 19 determines whether or not a conflict occurs (S7). The refill processing section 17 stores way information and line information being refilled in the refilling information register 18.

When a refill is to be subsequently performed for a second access request while the refill is being performed for a first access request, the conflict detection section 19 compares the way information and the line information for the first access request and the way information and the line information for the second access request, and determines whether or not the way information and the line information for the first access request and the way information and the line information for the second access request match each other.

When the way information and the line information for the first access request match the way information and the line information for the second access request, the conflict detection section 19 outputs the conflict information CI indicating that the conflict occurs to the control section 13. That is, the conflict detection section 19 constitutes a match determination section configured to determine whether or not a way being refilled for a first cache miss detected by the hit determination section 15 and the refill candidate way for a second cache miss detected after the first cache miss match each other.

When no conflict occurs (S7: NO), the control section 13 operates the refill processing section 17 to refill the storage section 14 with the data read out from the main memory (S8). Subsequently, the control section 13 operates the tag update section 16 to update the status information in the binary tree information section based on the way information and the line information for the second access request (S9).

That is, when the conflict detection section 19 determines that the way being refilled and the refill candidate way do not match each other (S7: NO), the control section 13 controls the refill processing section 17 to perform a refill for the second cache miss (S8), and also updates the status information in the binary tree information section 22 by using the way information refilled for the second cache miss.

When the conflict occurs (S7: YES), the control section 13 operates the tag update section 16 to update the status information in the binary tree information section 22 based on the way information subjected to the refill process for the first access request (S10). The process then returns to S6.

When no conflict occurs (S7: NO), the refill process is executed on a different line even of a same way, and the binary tree information is also updated. However, if the refill for the first access request is still being performed when the conflict occurs (S7: YES), the binary tree information may not be updated yet. Thus, even when the search section 21 executes a search again, a same way as that when the conflict is detected may be determined as the candidate way.

Thus, in the present embodiment, the search section 21 searches for the way candidate for the line to be refilled (S6) after the tag update section 16 is operated to update the status information in the binary tree information section based on the way information for the first access request (S10). That is, when the conflict detection section 19 determines that the way being refilled and the refill candidate way match each other, the control section 13 searches for the way candidate for the line to be refilled after updating the predetermined information in the binary tree information section by using the way information being refilled.

As described above, when the conflict occurs (S7: YES), the replacement control section 20 updates the binary tree information by using the way information for the first access request. Therefore, in S6, the way candidate for the line to be refilled is searched for in a state same as the state of the binary tree information after the refill process for the first access request after the refill is performed for the first access request. Accordingly, the same way as that when the conflict is detected is not determined as the candidate way.

Figure 4:
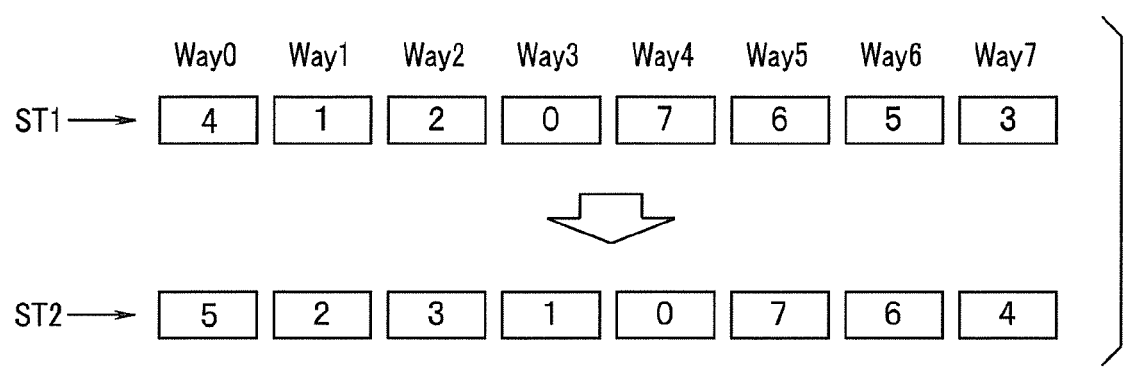
FIG. 4 is a view for explaining an order of ways selected by a replacement control section 20 according to the first embodiment.

FIG. 4 is a view for explaining an order of ways selected by the replacement control section 20. In ST1, it is shown that Way 4 is least recently used, and Way 3 is most recently used when the first access request is issued. Numbers of the respective ways show a frequency of use. As the number is larger, the way is less used. Therefore, in a state of ST1 in FIG. 4, the ways are selected by the replacement control section 20 using the LRU algorithm in the order of Ways 4, 5, 6, 0, 7, 2, 1, and 3.

For example, when the refill is executed by selecting a line of the Way 4, the order of the ways selected using the LRU algorithm is changed to a state of ST2. In the state of ST2, since the Way 4 is most recently used, the Way 4 is lowest in the order. In the state of ST2, the ways are selected by the replacement control section 20 using the LRU algorithm in the order of Ways 5, 6, 0, 7, 2, 1, 3, and 4.

In the present embodiment, when the way conflict occurs for the second access request during the refill for the first access request, the binary tree information section 22 is updated, and the candidate way is selected after updating. Thus, the same way is not selected.

As described above, in accordance with the cache memory of the present embodiment, when there is a conflict which causes the refill process to be performed again on the same line of the same way during the refill, the candidate way is searched for after the LRU information in the replacement control section 20 is updated. Thus, the candidate way causing no conflict can be quickly determined.

Conventionally, when cache misses successively occur, a second refill is performed after completion of a first refill. Thus, when the refill has a large number of cycles, a latency in the cache miss is deteriorated. However, in the present embodiment, the refill can be performed in parallel without waiting for the completion of the first refill. Accordingly, the cache memory capable of improving the latency in the cache miss can be achieved.

Particularly, it is not necessary to add a special processing circuit to the search section for the case in which there is a conflict in which the refill process is to be performed again on the same line of the same way during the refill process. That is, since the LRU algorithm is used in the refill, a circuit of the search section does not need to be changed, and the number of circuits added thereto is also reduced.

Furthermore, when the refill process is to be performed for two access requests, the processing in the tag update section does not depend on the number of ways, nor the number of times of cache miss occurrence. Thus, high versatility is achieved.

Second Embodiment

In the first embodiment, when the conflict of the refill candidate way occurs, the candidate way is searched for after updating. In a second embodiment, the binary tree information section is updated under a predetermined condition even when the conflict of the refill candidate way does not occur.

In a cache memory 1A of the present embodiment, description on same constituent elements as those of the cache memory 1 of the first embodiment is omitted by assigning same reference numerals thereto, and different components are described.

Figure 5:
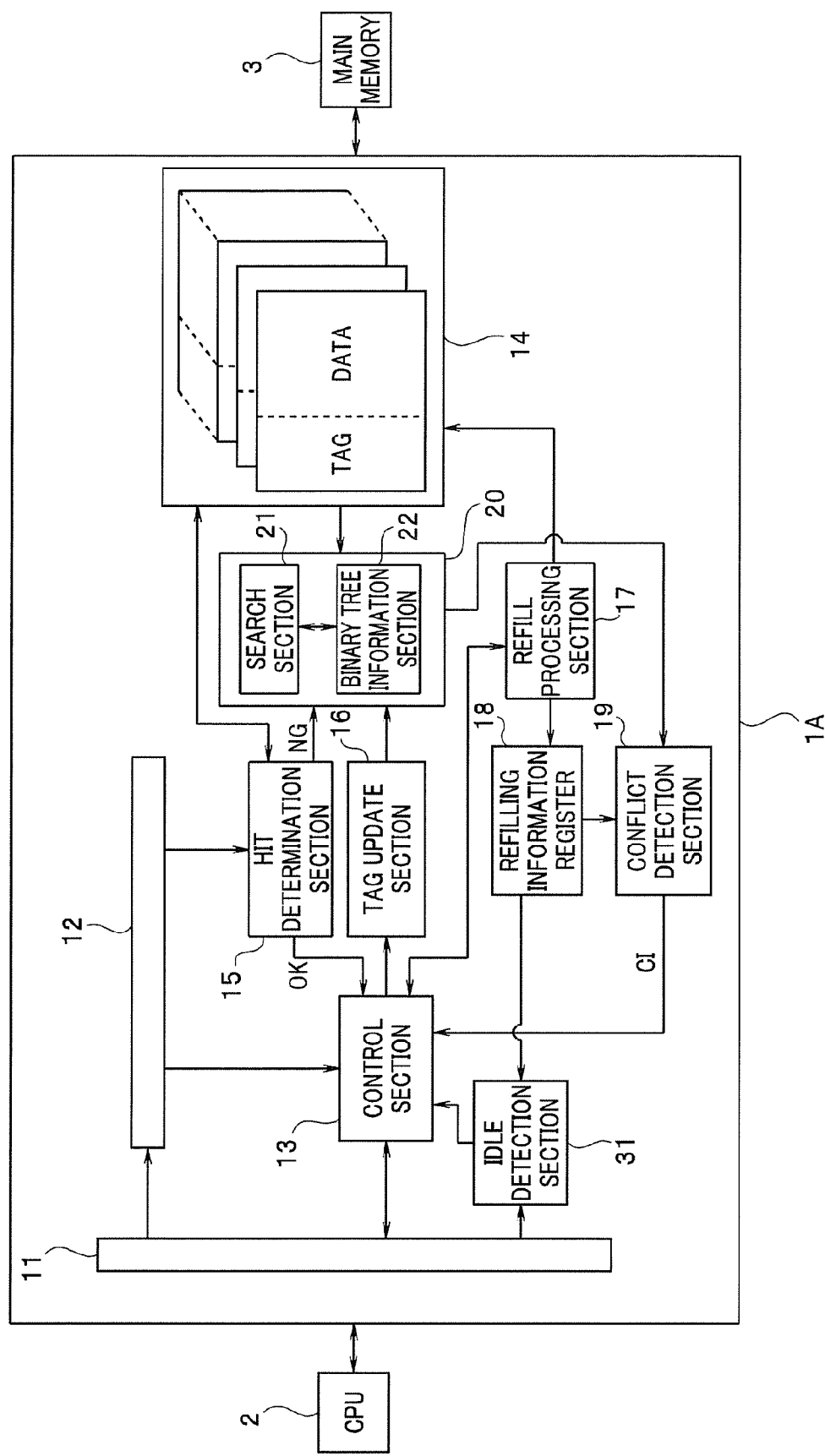
FIG. 5 is a block diagram illustrating a configuration of a cache memory of a second embodiment.

FIG. 5 is a block diagram of the cache memory of the present embodiment. In the cache memory 1A of the present embodiment, an idle detection section 31 is added to the cache memory 1 in FIG. 1.

The idle detection section 31 is a circuit configured to monitor the input/output interface 11, and determine whether or not the access request is not input for a predetermined time period or more. The idle detection section 31 also has a function to supply latest way information and line information (that is, being refilled) stored in the refilling information register 18 to the control section 13 when the access request is not input for a predetermined time period or more.

When the idle detection section 31 determines that the access request is not input for a predetermined time period or more, the control section 13 executes a process from a position indicated by an encircled number 1 in FIG. 3, that is, executes the process from S6 to S10.

That is, when the idle detection section 31 determines that the second access request is not received for a predetermined time period or longer after the first access request is received, the control section 13 controls the tag update section 16 to update the predetermined information in the binary tree information section by using the way information being refilled. In the present embodiment, when the control section 13 is free such as when there is no access or when the control section 13 is in an idle state, the control section 13 updates the binary tree information section 22 in preparation for a next access request. The cache memory of the present embodiment is particularly effective when it takes time to perform a refill.

As described above, the second embodiment has the same effect as the first embodiment, and can achieve the cache memory capable of minimizing the occurrence of a conflict when there is no access request. That is, the binary tree information relating to the first access request can be updated before the second access request occurs. Therefore, a probability of the conflict occurrence as described above in the second access request can be reduced.

Although the cache memory is the set associative cache memory in the aforementioned two embodiments, the aforementioned two embodiments may be also applied to a full associative cache memory.

Although the L1 cache close to the CPU is employed as an example of the cache memory in the above two embodiments, the above two embodiments may be also applied to L2 and L3 caches.

While certain embodiments have been described, these embodiments have been presented by way of example only, and are not intended to limit the scope of the inventions.

Indeed, the novel circuits and processors described herein may be embodied in a variety of other forms; furthermore, various omissions, substitutions and changes in the form of the circuits and processors described herein may be made without departing from the spirit of the inventions. The accompanying claims and their equivalents are intended to cover such forms or modifications as would fall within the scope and spirit of the inventions.

What is claimed is:

1. A cache memory control circuit configured to control a cache memory having a plurality of ways and storing cache data, the cache memory control circuit comprising:
    a cache miss detection section configured to detect a cache miss for an access request;
    a search section configured to determine a way and a line of a refill candidate by searching the plurality of ways based on a predetermined algorithm when the cache miss is detected;
    a refill processing section configured to refill the cache memory by replacing the cache data when the cache miss is detected;
    an information storage section configured to store predetermined information for the predetermined algorithm;
    a match determination section configured to determine whether or not way information and line information being refilled for a first cache miss with respect to a first access request respectively match way information and line information of the refill candidate for a second cache miss detected with respect to a second access request received after the first cache miss; and
    a control section configured to update the predetermined information by using the way information and the line information being refilled, and cause the search section to determine the way and the line of the refill candidate based on the predetermined algorithm when it is determined that the way information and line information being refilled respectively match the way information and line information of the refill candidate.

2. The cache memory control circuit according to claim 1, wherein when it is determined that the way information and the line information being refilled do not respective match the way information and the line information of the refill candidate, the control section controls the refill processing section to perform a refill for the second cache miss, and updates the predetermined information by using the way information and the line information refilled for the second cache miss.

3. The cache memory control circuit according to claim 1, wherein when a cache hit is detected for the access request, the control section updates the predetermined information by using the way information and the line information where the cache hit occurs.

4. The cache memory control circuit according to claim 1, further comprising an idle detection section configured to detect that the second access request is not received for a predetermined time period or longer after a first access request is received,
    wherein the update section updates the predetermined information by using the way information and the line information being refilled when the second access request is not received for the predetermined time period or longer.

5. The cache memory control circuit according to claim 1, wherein the predetermined algorithm is a least recently used (LRU) algorithm.

6. The cache memory control circuit according to claim 5, wherein the LRU algorithm is a pseudo LRU algorithm.

7. The cache memory control circuit according to claim 6, wherein the pseudo LRU algorithm is a pseudo LRU algorithm having a tree structure.

8. The cache memory control circuit according to claim 7, wherein the predetermined information is binary tree information.

9. A processor comprising:
a central processing unit;
a cache memory having a plurality of ways and configured to store cache data in a predetermined unit; and
a cache memory control circuit configured to control the cache memory, the processor further comprising:
  a cache miss detection section configured to detect a cache miss for an access request from the central processing unit;
  a search section configured to determine a way and a line of a refill candidate by searching the plurality of ways based on a predetermined algorithm when the cache miss is detected;
  a refill processing section configured to refill the cache memory by replacing the cache data when the cache miss is detected;
  an information storage section configured to store predetermined information for the predetermined algorithm;
  a match determination section configured to determine whether or not way information and line information being refilled for a first cache miss with respect to a first access request respectively match way information and line information of the refill candidate for a second cache miss detected with respect to a second access request received after the first cache miss; and
  a control section configured to update the predetermined information by using information of the way information and the line information being refilled, and cause the search section to determine the way and the line of the refill candidate based on the predetermined algorithm when it is determined by the match determination section that the way information and the line information being refilled respectively match the way information and the line information of the refill candidate.

10. The processor according to claim 9, wherein the cache memory is a set associative or full associative cache memory.

11. The processor according to claim 9, wherein when it is determined that the way information and the line information being refilled do not respectively match the way information and the line information of the refill candidate, the control section controls the refill processing section to perform a refill for the second cache miss, and updates the predetermined information by using the way information and the line information refilled for the second cache miss.

12. The processor according to claim 9, wherein when a cache hit is detected for the access request, the control section updates the predetermined information by using way information and line information where the cache hit occurs.

13. The processor according to claim 9, further comprising an idle detection section configured to detect that the second access request is not received for a predetermined time period or longer after a first access request is received,
  wherein the update section updates the predetermined information by using the way information and the line information being refilled when the second access request is not received for the predetermined time period or longer.

14. The processor according to claim 9, wherein the predetermined algorithm is a least recently used (LRU) algorithm.

15. The processor according to claim 14, wherein the LRU algorithm is a pseudo LRU algorithm.

16. The processor according to claim 15, wherein the pseudo LRU algorithm is a pseudo LRU algorithm having a tree structure.

17. The processor according to claim 16, wherein the predetermined information is binary tree information.

* * * * *